Figure 1:
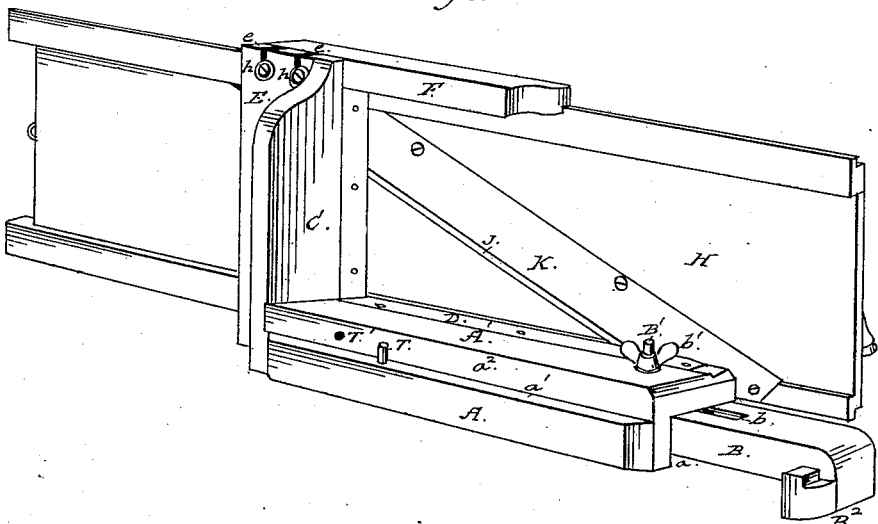

(No Model.)  2 Sheets—Sheet 1.

A. & A. ISKE.
MEAT SLICING MACHINE.

No. 267,083.  Patented Nov. 7, 1882.

WITNESSES
F. W. Howard
Edw. G. Siggers.

INVENTORS
Anthony Iske and Albert Iske
by W. H. Babcock,
Attorney (No Model.)　　　　　　　　　　　　　　　　　2 Sheets—Sheet 2.
A. & A. ISKE.
MEAT SLICING MACHINE.
No. 267,083.　　　　　　　　　　　　　　Patented Nov. 7, 1882.
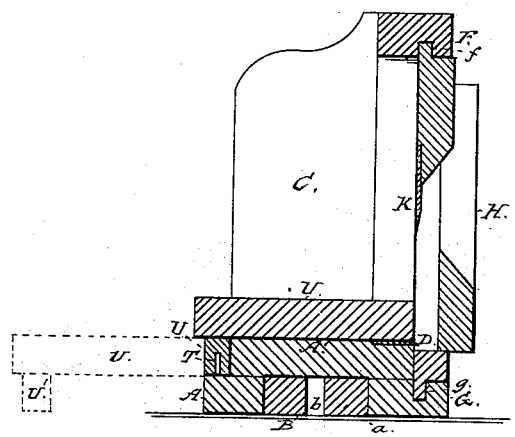
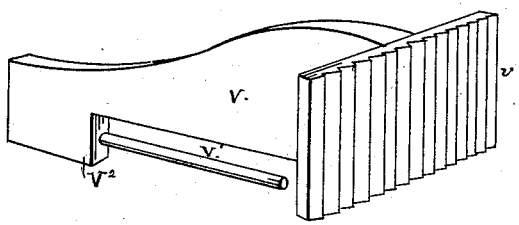
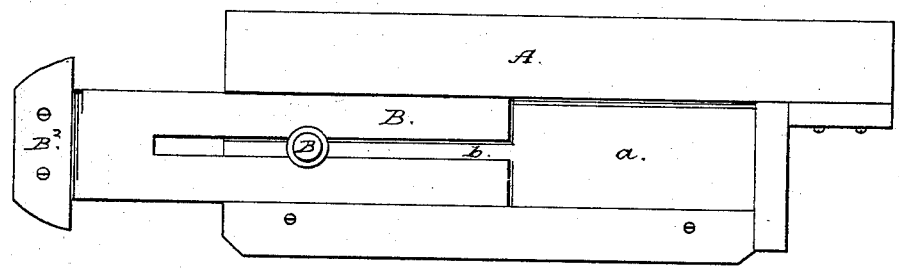
WITNESSES
F. W. Howard
Edw. G. Siggers
INVENTORS
Anthony Iske and Albert Iske
by W. H. Babcock,
Attorney

UNITED STATES PATENT OFFICE.

ANTHONY ISKE AND ALBERT ISKE, OF LANCASTER, PENNSYLVANIA, ASSIGNORS OF ONE-HALF TO ROBERT M. SLAYMAKER, OF SAME PLACE.

MEAT-SLICING MACHINE.

SPECIFICATION forming part of Letters Patent No. 267,083, dated November 7, 1882.

Application filed July 10, 1882. (No model.)

*To all whom it may concern:*

Be it known that we, ANTHONY ISKE and ALBERT ISKE, citizens of the United States residing at Lancaster, in the county of Lancaster and State of Pennsylvania, have invented certain new and useful Improvements in Meat-Slicing Machines; and we do hereby declare the following to be a full, clear and exact description of the invention, such as will enable others skilled in the art to which it appertains to make and use the same, reference being had to the accompanying drawings, and to letters or figures of reference marked thereon, which form a part of this specification.

This invention relates to devices for slicing meat, vegetables, and other articles, and is an improvement on Patent No. 162,823, granted to Anthony Iske, May 4, 1875.

The said invention consists, first, in a slicing-knife, a knife-frame, and a gage-board obliquely adjustable in said frame, in combination with an obliquely-slotted plate on said gage-board, a stud on said frame which enters said slot, a bracket attached to said frame, a screw-tapped plate attached to the end of said gage-board, a pair of guide-rods attached to said plate and extending obliquely through holes in said bracket, and an adjusting-screw extending obliquely through said bracket into said screw-tapped plate; second, in the base of a meat-slicing machine having a longitudinal channel in its under side, in combination with a reversible and longitudinally-movable slide, which fits in said channel, and a clamp-screw and nut for locking said slide in any position desired, said slide having a slot to receive said screw, and being provided at one end with a block; third, in the combination, with the cutter-table provided with a pin, of a supplemental cutter-table provided with sockets or recesses adapted to receive said pin, said supplemental table being adapted to sit upon the main cutting-table and to be held there by said pin and socket; and, finally, in a slicer-knife, a cutter-table having a lower platform, and a pin extending upward therefrom, in combination with a supplemental cutting-table which has a block on its under side at the front, and the two sockets, arranged as hereinafter stated, whereby either of them may be used for attaching this supplemental to the main cutting-table, substantially as hereinafter set forth.

Figure 2:
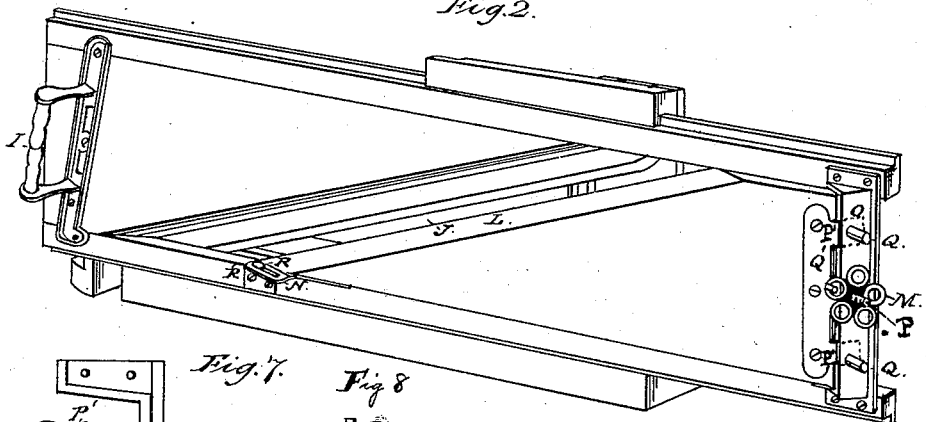
Figures 7, 8:
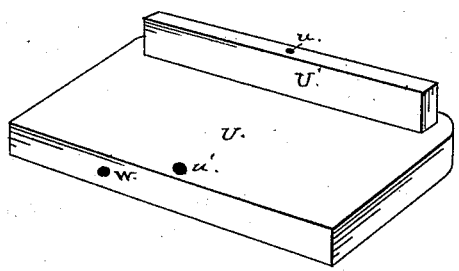
Figure 3:
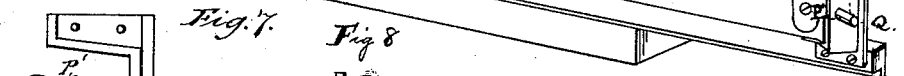

In the accompanying drawings, Figure 1 represents a front perspective view of a slicing-machine embodying my invention, without the supplementary table and the feeder. Fig. 2 represents a rear perspective view of the same. Fig. 3 represents a detail lower perspective of the supplementary table. Fig. 4 represents a transverse vertical section taken through the supplementary table as well as the main table, the former being in position for cutting, its position when attached so as to be flush with the top of the main table being indicated by dotted lines. Fig. 5 represents a detail perspective view of the feeder. Fig. 6 represents a bottom view, showing the reversible slide and the channel in which it moves. Fig. 7 represents an enlarged detached view of the devices for adjusting and guiding the gage-board; and Fig. 8 represents an enlarged detail view of the nut and screw-threaded rod used for that purpose.

In said drawings, A designates the base of the machine, in the bottom of which is formed a longitudinal channel, $a$. In this channel is fitted a longitudinally-movable slide, B, which is provided with a slot, $b$, that extends from its inner end outward, and bolt B', whereby, with the aid of a nut, $b'$, said slide may be clamped at any degree of extension desired. The outer end of slide B has a head, B², formed thereon, and extending upward or downward, according to the position of said reversible slide. When said head is turned downward, as shown in Fig. 1, it can be extended over the edge of a bench or other support, so as to serve as a brace. When said head is turned upward said slide rests on the top of said bench or other support and forms an extension of the end of base A. Said bolt and nut, when loosened, interpose no obstacle to the withdrawal, reversal, and reinsertion of said slide. The top of the base through which said bolt protrudes constitutes the cutting-table A', to one end of which is secured an upright wall, C. The back part of this cutting-table has a horizontal knife-plate, D, set flush into it and extending slightly beyond its rear edge. The corresponding part of wall C is also provided with a similar plate. This may be an extension of knife-plate D.

E designates a vertical wall or standard, attached rigidly to base A and wall C, but in a plane at right angles to that of the latter. This wall E has a guideway, G, attached to the rear side thereof at its bottom, and another guideway, F, attached to the same side at its top. These guideways extend longitudinally of the machine, and are provided on their upper and lower face, respectively, with grooves $f$ and $g$, which receive and guide the sliding knife-frame H. To provide against binding or undue loosening of said knife-frame in said guides, we attach the upper guide, F, to frame or wall E by means of screws $h$, (of course bolts or other suitable clamping devices may be substituted,) which pass through slots $e\ e$, extending downward from the top of said wall. This adjustable method of fastening obviously allows compensation for the changes mentioned. It also facilitates the separation of the upper guideway from the rest of the frame when that becomes desirable.

The knife-frame H is provided near one end with a handle, I, whereby it is drawn back and pushed forward between said guideways. In the middle part of this frame is an oblique opening, J, extending nearly from top to bottom, and this opening is partly overlapped by the similarly-arranged slicing-knife K, which is set flush with the front of said frame H. Of course, as the operator pushes meat or vegetables over the cutting-table A' toward the slicing-knife K said knife, cutting close to the knife-plate D, will slice thin pieces off from the end presented to it. The thickness of the slices thus cut is governed by a gage-board or gage-plate, L, which has a beveled edge parallel to the edge of said slicing-knife, and is made obliquely adjustable in frame H, so that these edges will remain in the same oblique plane whatever the degree of adjustment. If the adjustment were longitudinal only, it obviously would not affect the thickness of the slice. If only lateral, as heretofore, the thickness of the slice would be regulated, but at each adjustment the inclined plane passing through the edge of the gage-board and the edge of the slicer-knife would be changed. In consequence the distance between them would not increase proportionally with the increase in the thickness of the slice; but the latter would be obliged to pass through an outlet-opening between such edges, which would be in a less ratio to its thickness than before. By making the adjustment oblique, however, we obviously effect a greater separation of said edges, while the increase in the thickness of the slice remains the same as when only a direct rear adjustment is used. To effect this oblique adjustment, we make use of an obliquely-arranged adjusting-screw, M, and an obliquely-slotted plate, N. The former works through a bracket or bar, O, attached to frame H, and into a threaded inclined lug, P, projecting to the outer end of said gage-board. Stout guide-rods Q, similarly inclined, extend outward from the same end of this gage-board and pass through openings in said bracket O. They serve to brace said screw and preserve it from undue strain. They are preferably attached to inclined lugs or plates P', which are attached to or in one piece with a plate, Q', secured to the back of the gage-board at the outer end thereof. The slotted plate N is attached to the lower inner corner of said gage-board, and receives a T-shaped stud or head, R, that rises from a plate, R', secured to the lower part of the back of frame H. Screw M is provided with a wheel and handle. When turned thereby it moves the gage-plate or gage-board in or out, and the slotted plate N guides the other end of said gage-board in the same direction. This slotted plate may of course be applied to other parts of the gage-board, and the other adjusting and guiding devices may be changed considerably without going outside of the spirit or scope of my invention.

The upper part of the front of base A is removed so as to leave a lower horizontal platform, $a'$, with a vertical wall, $a^2$, above it. A pin, T, extends upward from the former, and near it a recess or socket, T', extends horizontally into the latter.

U designates a supplemental cutting-table, having a longitudinal block, U', attached to the front of its under side. In the bottom of this block is an upwardly-extending recess or socket, $u$, which receives pin T when said supplemental table is placed upon the main table A'. This considerably raises the surface over which the feeding is done, and by bringing the material to be cut closer to the upper part of the slicing-knife it facilitates the cutting of small pieces. This supplemental table may also be used as a front extension of the main table and base. In the under side of its rear part we make a recess or socket, $u'$, which is adapted to receive said pin T. When the parts are thus brought together the block U' rests on the supporting bench or table, the rear end of the supplemental cutting-table U rests on platform $a'$, and the top of table U is flush with the table A'.

In feeding small articles the fingers are often endangered. We therefore provide an artificial hand or feeder, V, which is provided with a guide-rod, V', that slides in recess T', the bottom of the feeder itself moving over table A'. This feeder is T-shaped, and its rear part, which is parallel to the knife-frame, has vertical ridges or flutings $v$ formed thereon, to insure its catching the articles to be fed. It is moved in and out by hand. To enable it to operate over the top of supplemental cutting-table U a socket or recess, W, similar to V', is formed in the front of said table U and adapted to receive and guide said rod V'.

Having thus described my invention, what I claim as new, and desire to secure by Letters Patent, is—

1. A slicing-knife, a knife-frame, and a gage-board obliquely adjustable in said frame, in combination with an obliquely-slotted plate on said gage-board, a stud on said frame which enters said slot, a bracket attached to said frame, a screw-tapped plate attached to the end of said gage-board, a pair of guide-rods attached to said plate and extending obliquely through holes in said bracket, and an adjusting-screw extending obliquely through said bracket into said screw-tapped plate.

2. The base A of a meat-slicing machine, having a longitudinal channel, $a$, in its under side, in combination with reversible and longitudinally-movable slide B, which fits in said channel, and a clamp-screw and nut for locking said slide in any position desired, said slide having a slot to receive said screw, and being provided at one end with a block, $B^2$, substantially as set forth.

3. In combination with the cutter-table provided with a pin, a supplemental cutter-table provided with sockets or recesses adapted to receive said pin, said supplemental table being adapted to sit upon the main cutting-table and to be held there by said pin and socket, substantially as set forth.

4. A slicer-knife, a cutter-table having a lower platform, and a pin extending upward therefrom, in combination with a supplemental cutting-table which has a block on its under side, at the front, and the two sockets $u\ u'$, arranged as stated, whereby either of them may be used for attaching this supplemental table to the main cutting-table, as set forth.

In testimony whereof we affix our signatures in presence of two witnesses.

ANTHONY ISKE.
ALBERT ISKE.

Witnesses:
P. DONNELLY,
JAS. B. DONNELLY.